(12) United States Patent
Clark

(10) Patent No.: US 7,059,299 B2
(45) Date of Patent: Jun. 13, 2006

(54) MULTI-STAGE SLIDING AIR THROTTLE VALVE ASSEMBLY AND CYLINDER ASSEMBLY ENGINE INCLUDING SAME

(76) Inventor: Arvel L. Clark, 1300 Post Oak Blvd., Ste. 250D, Houston, TX (US) 77056

( * ) Notice: Subject to any disclaimer, the term of this patent is extended or adjusted under 35 U.S.C. 154(b) by 0 days.

(21) Appl. No.: 10/674,514

(22) Filed: Sep. 29, 2003

(65) Prior Publication Data

US 2005/0066935 A1 Mar. 31, 2005

(51) Int. Cl.
*F02D 9/00* (2006.01)

(52) U.S. Cl. .................................. 123/337; 123/181.56
(58) Field of Classification Search ............ 123/184.21, 123/184.22, 184.47, 184.51, 184.55, 184.56, 123/337, 336, 403
See application file for complete search history.

(56) References Cited

U.S. PATENT DOCUMENTS

| 5,454,357 A | * | 10/1995 | Elder | 123/337 |
| 5,596,966 A | * | 1/1997 | Elder | 123/337 |

* cited by examiner

*Primary Examiner*—Bibhu Mohanty
(74) *Attorney, Agent, or Firm*—Beirne, Maynard & Parsons; William C. Norvell, Jr.

(57) ABSTRACT

A multi-stage air throttle valve assembly is provided for use in a multiple cylinder engine. The valve assembly provides a series of shiftable valve plates to provide full, maximum opening of air ports having passageways therethrough for introduction of air into the combustion cylinders of the engine. By use of two or more such sliding plates, the port size through the assembly may be maximized for enhanced volumetric entry of air into the combustion chambers. A combined reed valve assembly, fuel injectors and/or an air velocity assembly with engine are also disclosed.

15 Claims, 16 Drawing Sheets

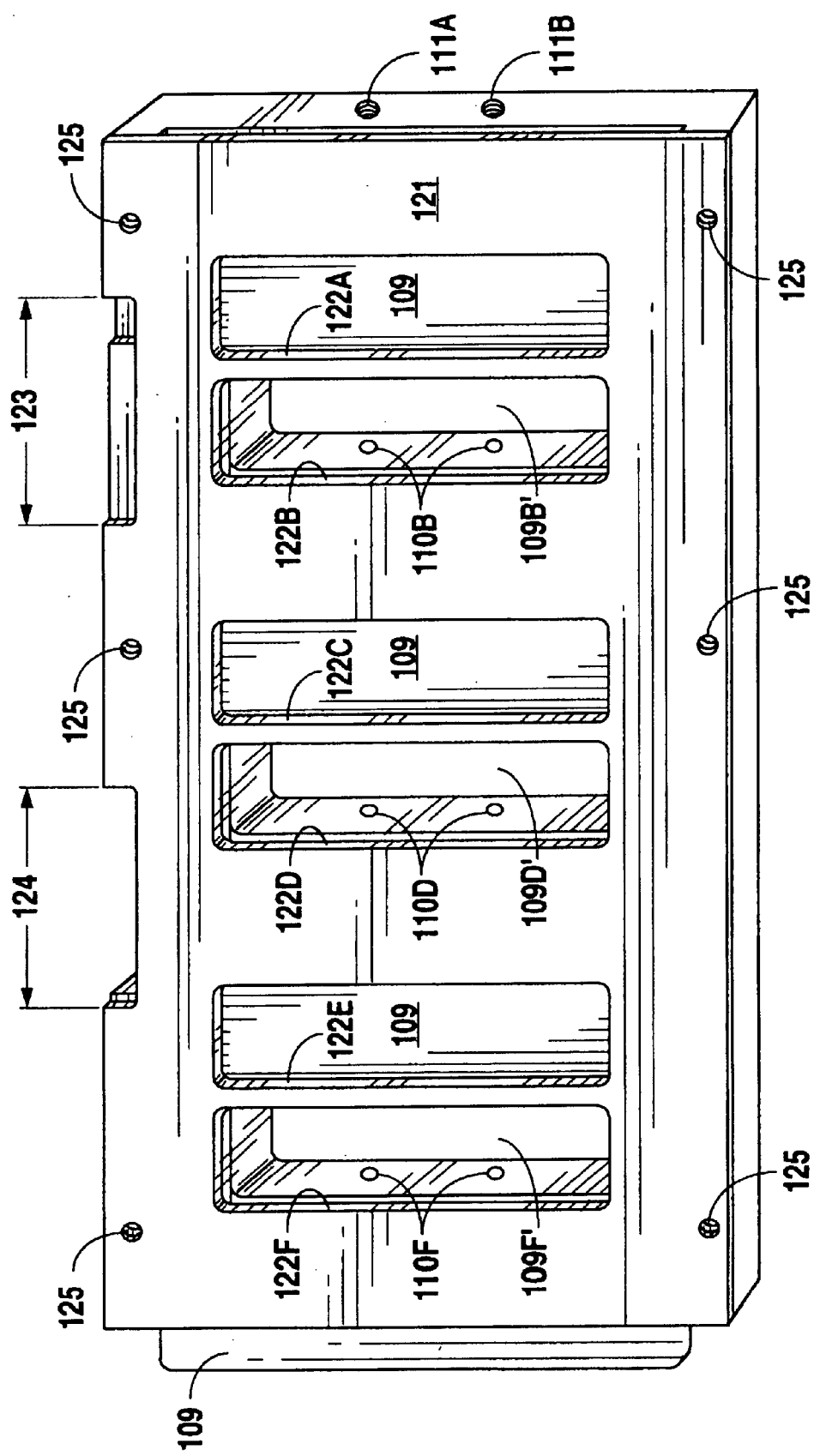

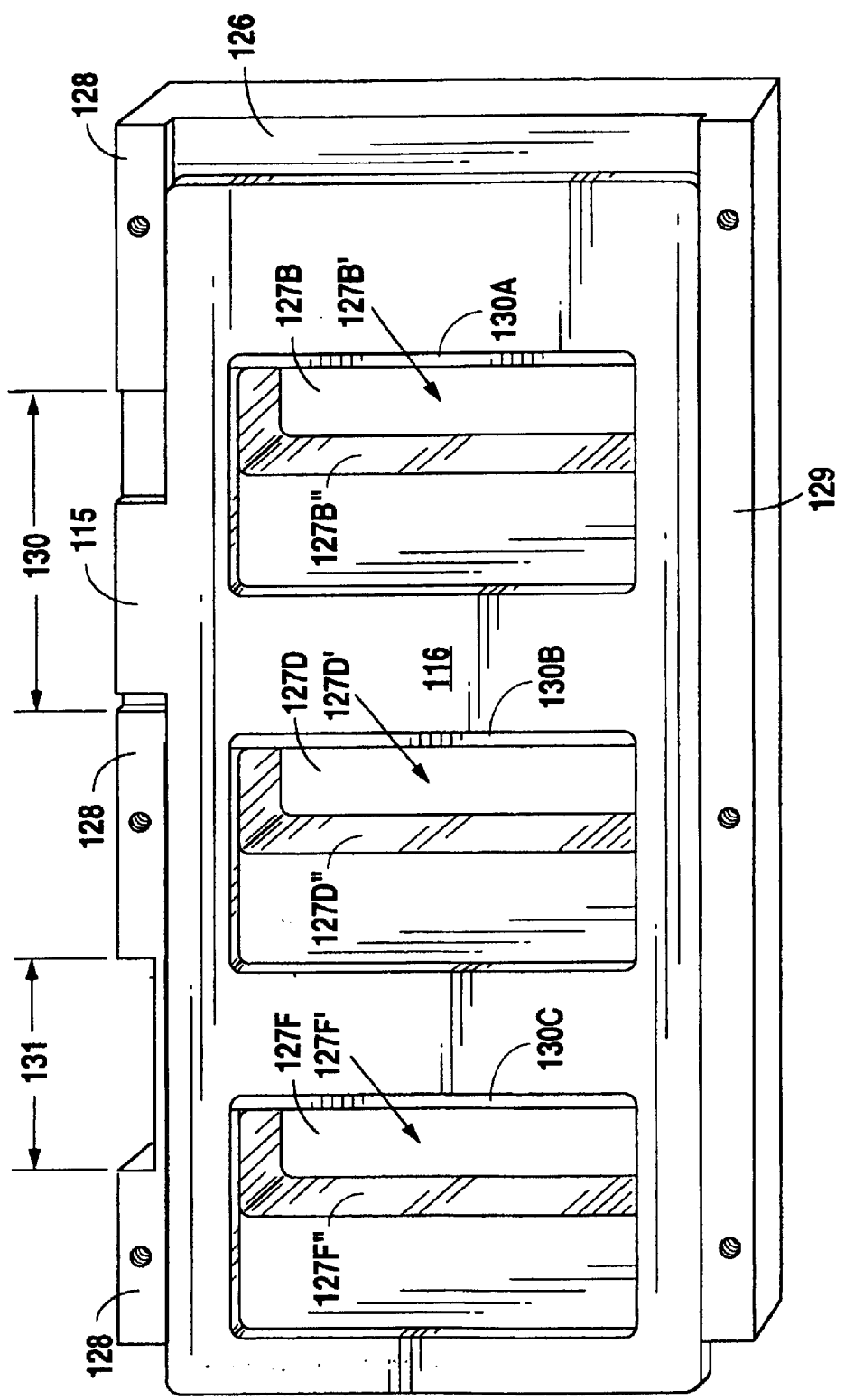

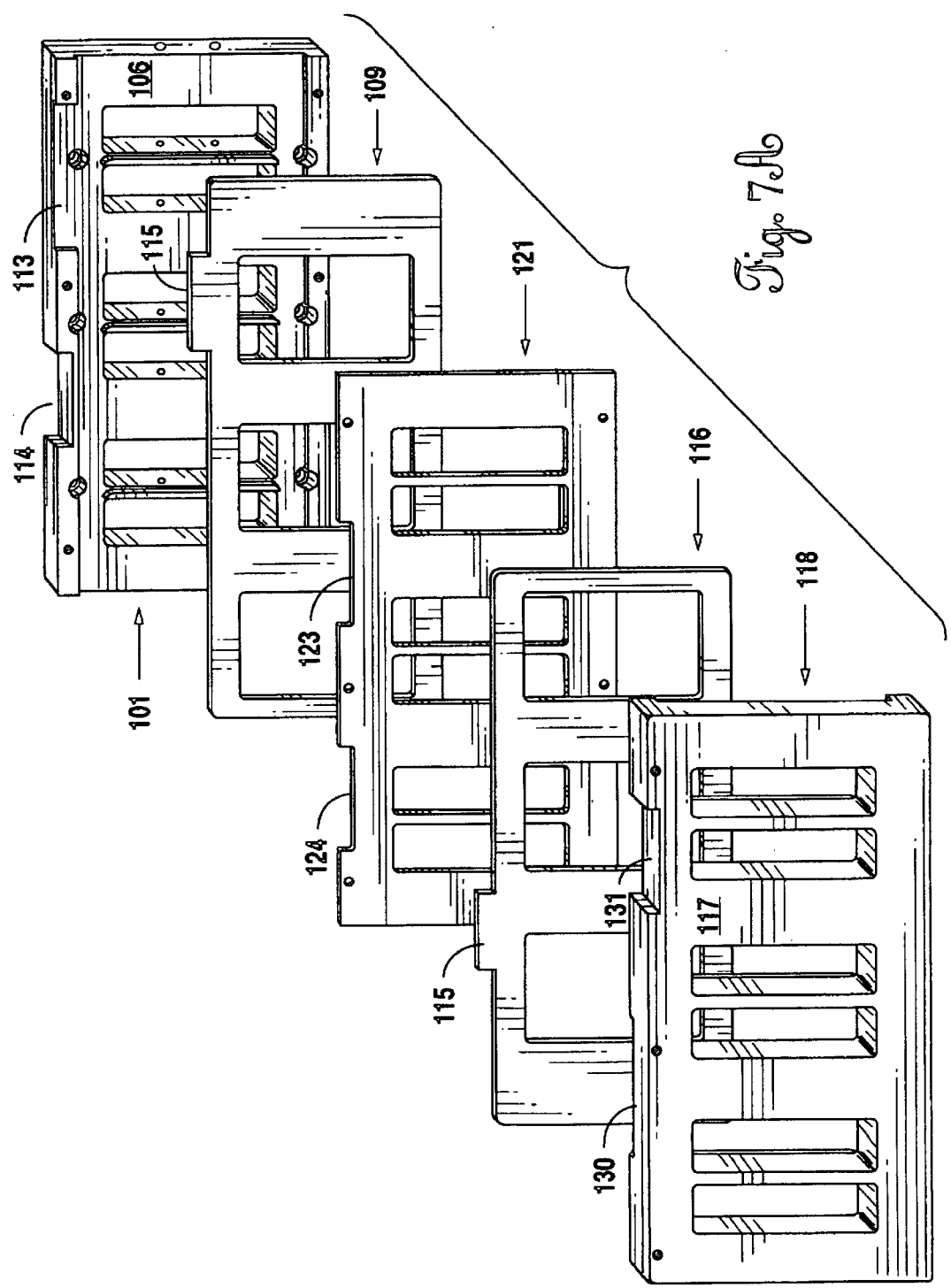

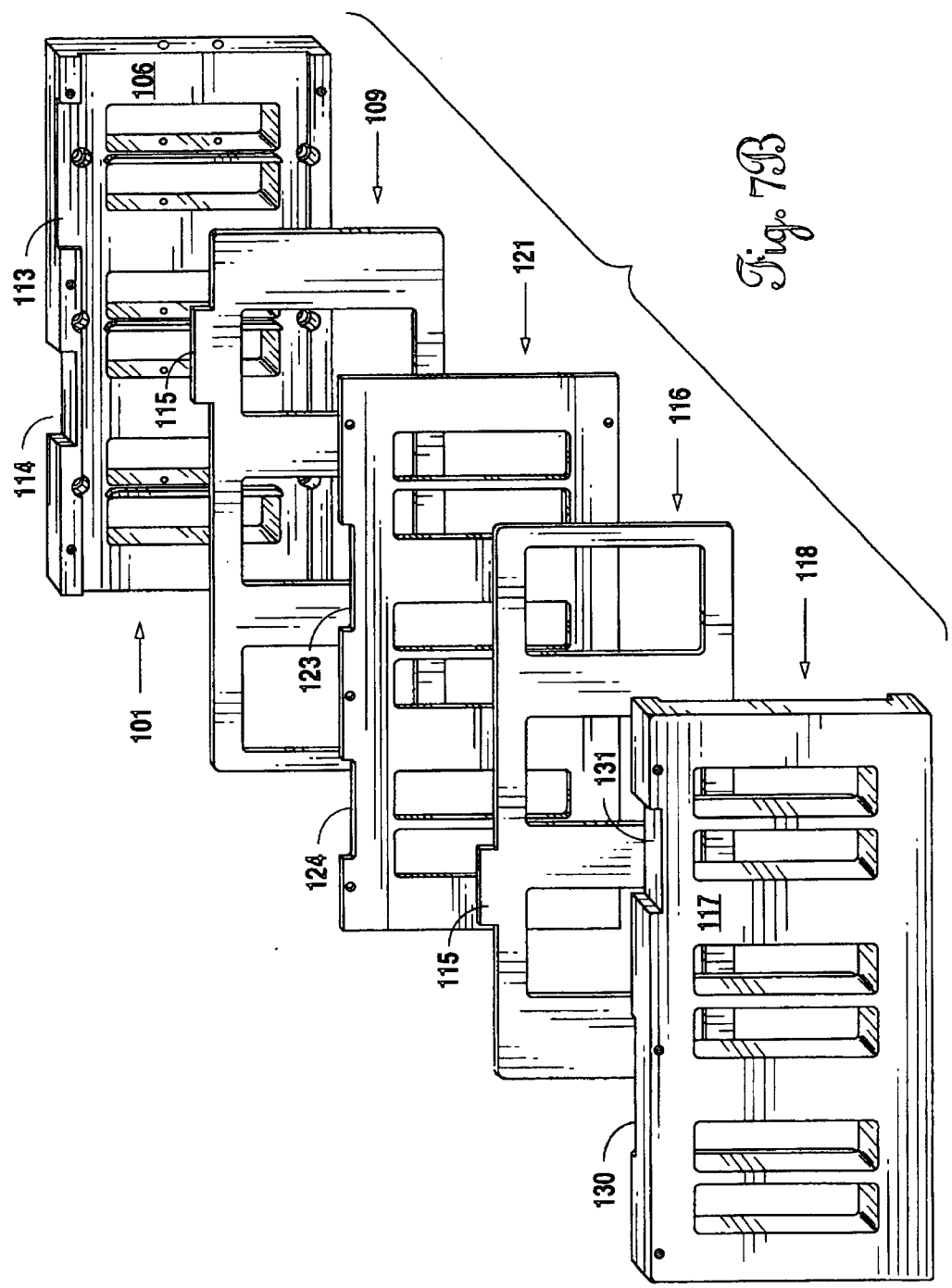

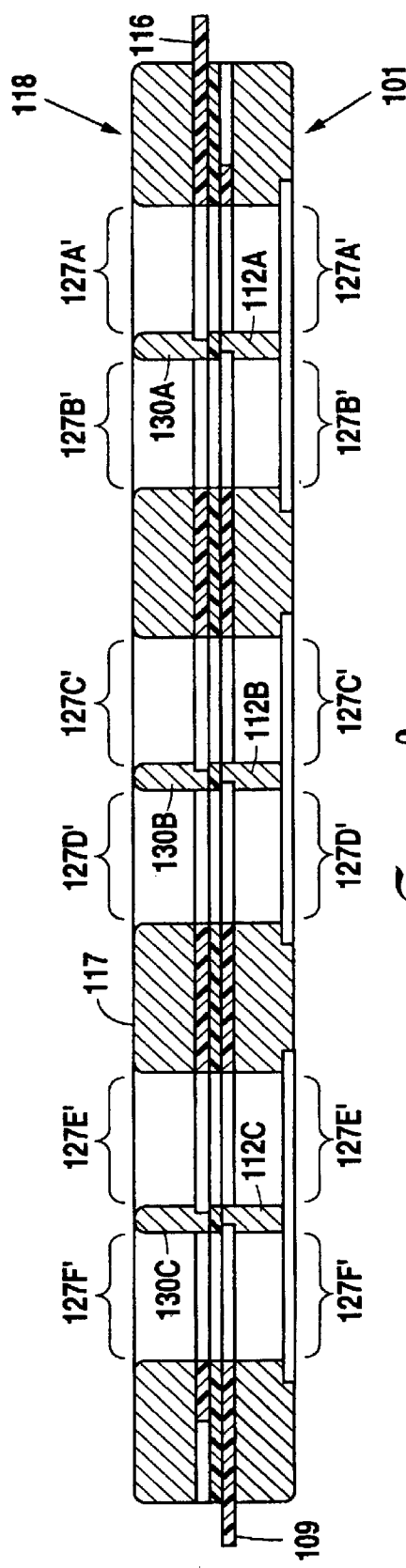
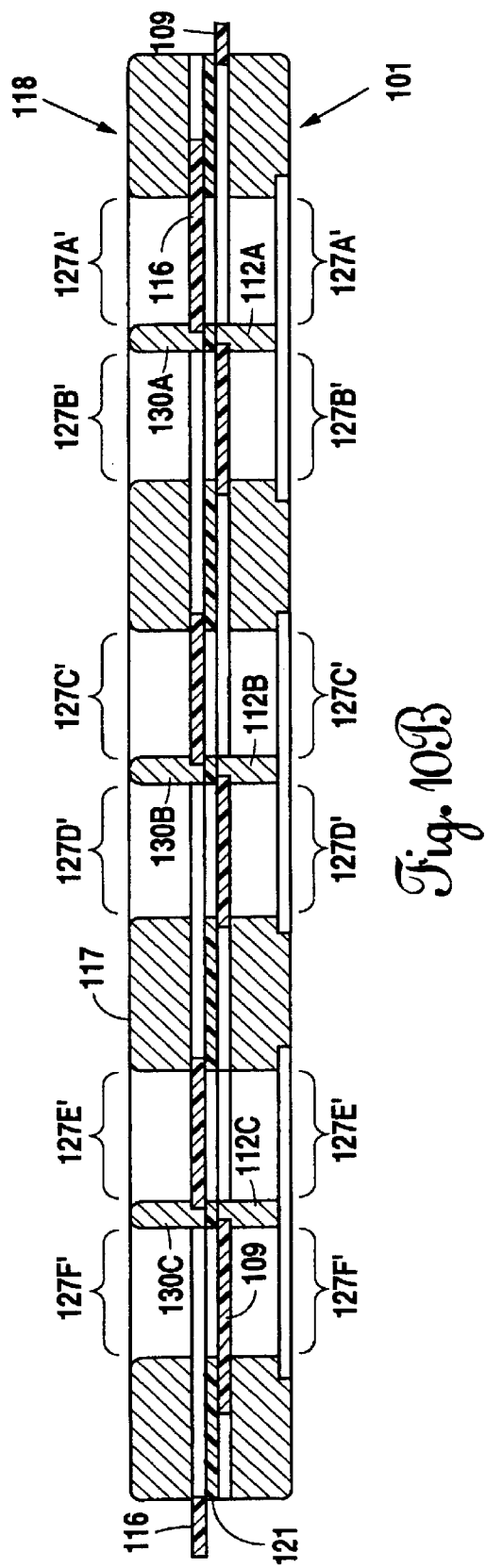
Fig. 10A
Fig. 10B

MULTI-STAGE SLIDING AIR THROTTLE VALVE ASSEMBLY AND CYLINDER ASSEMBLY ENGINE INCLUDING SAME

BACKGROUND OF THE INVENTION (1) Field of the Invention

The invention relates to multi cylinder internal combustion engines, such as, for use on boats, motorcycles, and the like.

(2) Brief Description of the Prior Art

It is well known that the speed at which a vehicle may be moved is highly dependent upon the power generated by the engine for that vehicle. Internal combustion, two cylinder engines fueled by a hydrocarbon fuel and mixture of air are common in vehicles, especially outboard motors for speed boats, and the like. It is always an objective of such engine design to incorporate air flow or intake systems which will permit maximum entry of air into the combustion cylinders. Quick adjustment of the air flow characteristics into the cylinders is very desirable to increase or decrease the speed of the boat In the past, butterfly valves have been used as a throttling system for air intake. However, such valves have been found to be rather undesirable when incorporated into outboard engines used in motorboat racing, where fine tuning is required for peak torque at specific rpm's.

Slide-type valves have been used in air intake systems for internal combustion engines as an alternative to butterfly valves. Typical of such slide valves is that design as shown in U.S. Pat. No. 4,454,537. Other slide valve designs are disclosed in U.S. Pat. No. 5,636,612. The slide-type valve design disclosed in the '612 patent is disadvantageous because it necessarily limits the size of the air ports through the valve assembly. This is because the design incorporates only one plate for slidable movements across the ports and the plate must be shifted in only one direction for opening of the ports and in the opposite direction for closing, or throttling, of the ports. It is highly desirable, for maximum air intake into the combustion cylinders, that the openings in the air intake assembly be as large as the openings of the cylinders.

The present invention addresses the problems associated with the designs of the prior art.

SUMMARY OF THE INVENTION

The invention relates to a multi-stage sliding air throttle valve assembly for use with a multiple cylinder engine. The air throttle valve assembly is defined by a housing which itself includes first and second housing members with each of the housing members having interior and exterior faces surfaces. A shifting slot is profiled on each of the housing members. The first housing member is securable, such as by use of sealable bolts, or the like, along the exterior face relative to the housing, or, alternatively, to an air velocity assembly which may, or may not, contain companion reed valves therein, all as hereinafter described and claimed. A plurality of ports define air passageways disposed through each of the housings, with each port being alignable with the opening of one of the internal combustion cylinders. The invention also provides a series of slidable throttle valve plates which are shiftable in a first position, such as toward one another (if only two valve plates are used), whereby each of the ports is fully open relative to the cylinders and which are shiftable in another direction, such as away from one another, whereby each of the ports is fully closed. The plates include a protruding tab member for operative receipt within one of the shifting slots. The movement of the plates relative to one another does not necessarily have to be to the fully open or fully closed position; rather, the plates may be moved to any position there between, repeatedly, for throttling or air intake into the chambers.

The invention also incorporates at least one throttle valve plate stop protruding from the interior face of the first housing member, as well as one protruding from the interior face of the second housing member. The respective stop is engageable with one of the valve plates for preventing slidable movements of the throttle valve plate in one direction during engagement. Means for shifting the throttle valve plates in the directions and to the positions as described, is also provided.

An air velocity chamber, as described, may also be included with the throttle valve assembly.

Reed valves may also be included in a component package air intake assembly of the invention.

The invention may also include a fuel injector system in combination with the disclosed air valve assembly for a complete air and fuel mixture assembly incorporated into an engine, all as described and claimed herein.

BRIEF DESCRIPTION OF THE DRAWINGS

FIG. 4 is a view similar to that of FIGS. 2, 3A and 3B, and further illustrating the placement of a non-moveable plate sealingly disposed over and across the first throttle valve plate.

FIG. 6B is a view similar to that of FIG. 6A, illustrating the positioning of the valve plate shown in FIG. 6A across the second housing such that the other half of the valve ports illustrated as opened in FIG. 3b are now fully closed.

FIG. 7A is a perspective view of the components of the throttle valve assembly of the present invention, in the order of assembly, with the valve plates shifted in a direction to a position to fully open the ports into the chambers.

FIG. 7B is a view similar to that of FIG. 7A, illustrating the component parts as the plates are shifted in a direction to a position to fully closed the ports into the chambers.

FIG. 10A is a cross-sectional view of the assembly when the throttle valve plates are shifted to the fully opened position.

FIG. 10B is also a cross-sectional view of the assembly when the throttle valve plates re shifted to the fully closed position.

FIG. 11 is a schematic illustration of the assembly including a fuel injection component.

DESCRIPTION OF THE PREFERRED EMBODIMENTS

Figure 1A:
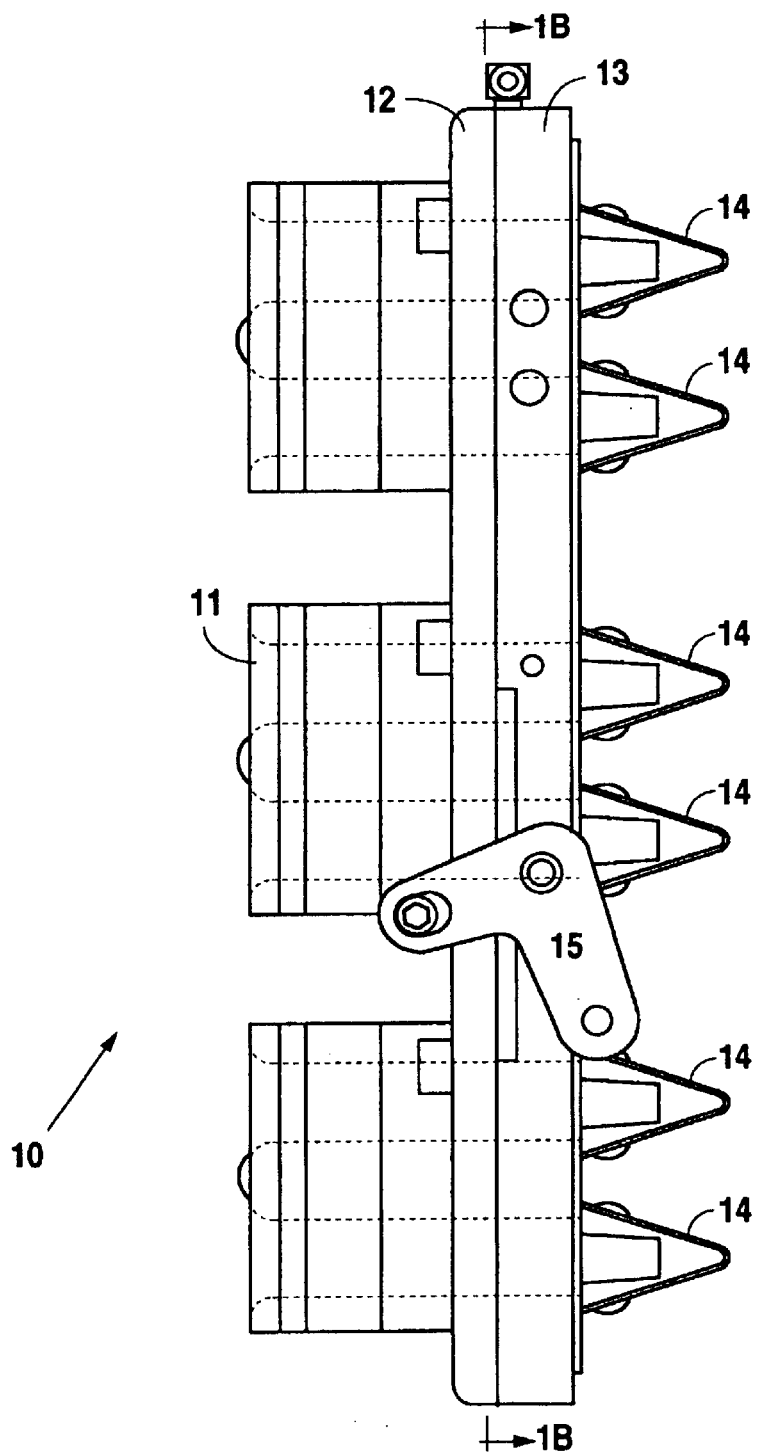
FIG. 1A is a side schematic illustration of an air intake and reed valve system of the prior art, such as that described in U.S. Pat. No. 5,636,612.

With first reference to FIG. 1A, there is shown a prior art throttle valve device 10. The illustration and the device 10 are as illustrated and described in U.S. Pat. No. 5,636,612, entitled "Adjustable Air Velocity Stacks For Two-Stroke Fuel Injected Engines", issued Jun. 10, 1997. FIG. 1A is based upon the illustration of FIG. 11 of the '612 prior art patent. The prior art device 10 shows aan air velocity stack 11 on the intake side of the device 10 and secured to a single valve plate component 12 slidably affixed onto a throttle valve housing 13. A series of Reed valve assemblies 14e are also provided and are likewise affixed to the valve housing 13. The entire assembly is thus arranged and the housing is secured to the motor block (not shown) such that one Reed valve 14 is introduced within each respective ignition cylinder chamber (not shown) within the motor block. An armature 15 is provided to shift the single valve plate between opening and closing positions across the interior of the housing 13.

Figure 1B:
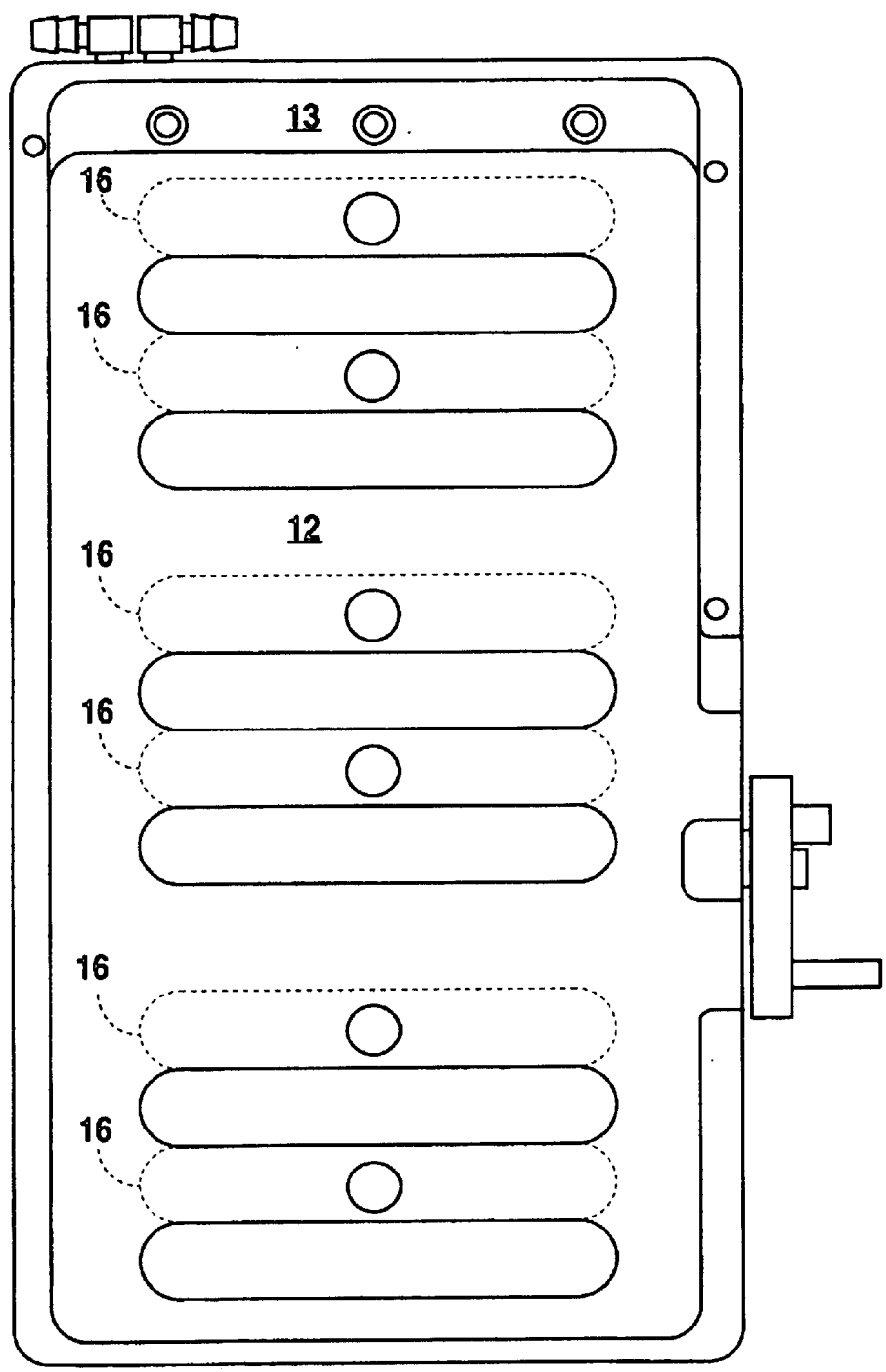
FIG. 1B is a view taken along line 1B—1B of FIG. 1A, illustrating the same prior art air intake plate across the engine chambers.

Now referring to FIG. 1B, it will be appreciated that the prior art throttle valve device is designed such the valve plate 12 will move in only one direction relative to the housing member 13 to fully close the ports 16 through the assembly which communicate with the interior of the ignition chambers and provide a passageway for air intake into the ignition chamber. Accordingly, the size and spacing of the chamber openings or ports 16 through the housing member 13 is limited to the cross-sectional area and spacing of the area provided in the throttle valve plate for closing across or sealingly bridging the ports for closure purposes. Since it is desirable to size the ports to equal the maximum opening through the respective ignition chamber and to also provide a valving of these openings to maximize the openings therethrough, this prior art throttle valve concept is disadvantageous because its design limitation prohibits use of the maximum opening or ports in the valve housing relative to the ignition chambers and for complete closure thereof, as desired, for any given size or configuration of throttle plate valve structure.

Figure 2:
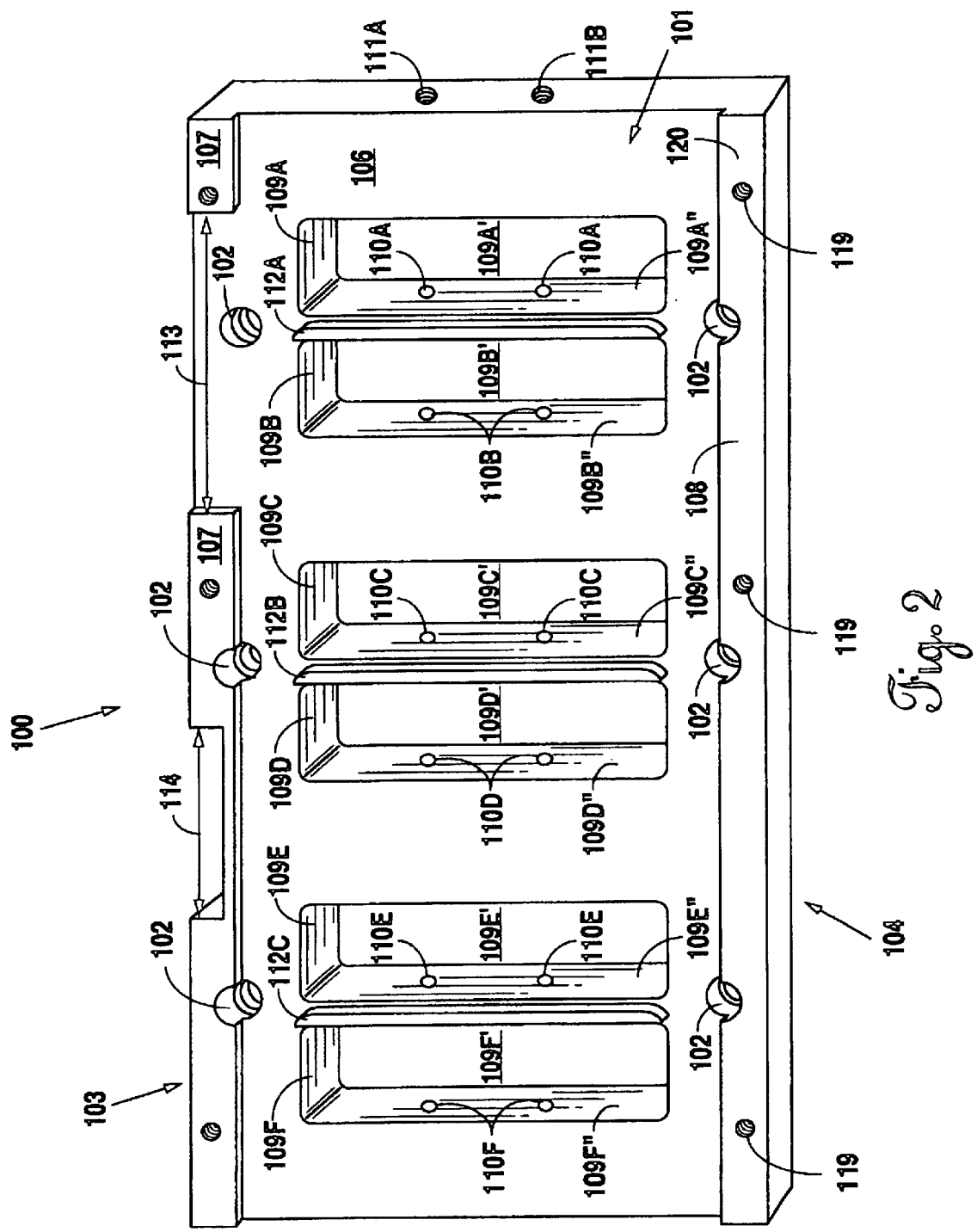
FIG. 2, is a schematic illustration of the interior of first housing member of the housing of the present invention.
Figure 8:
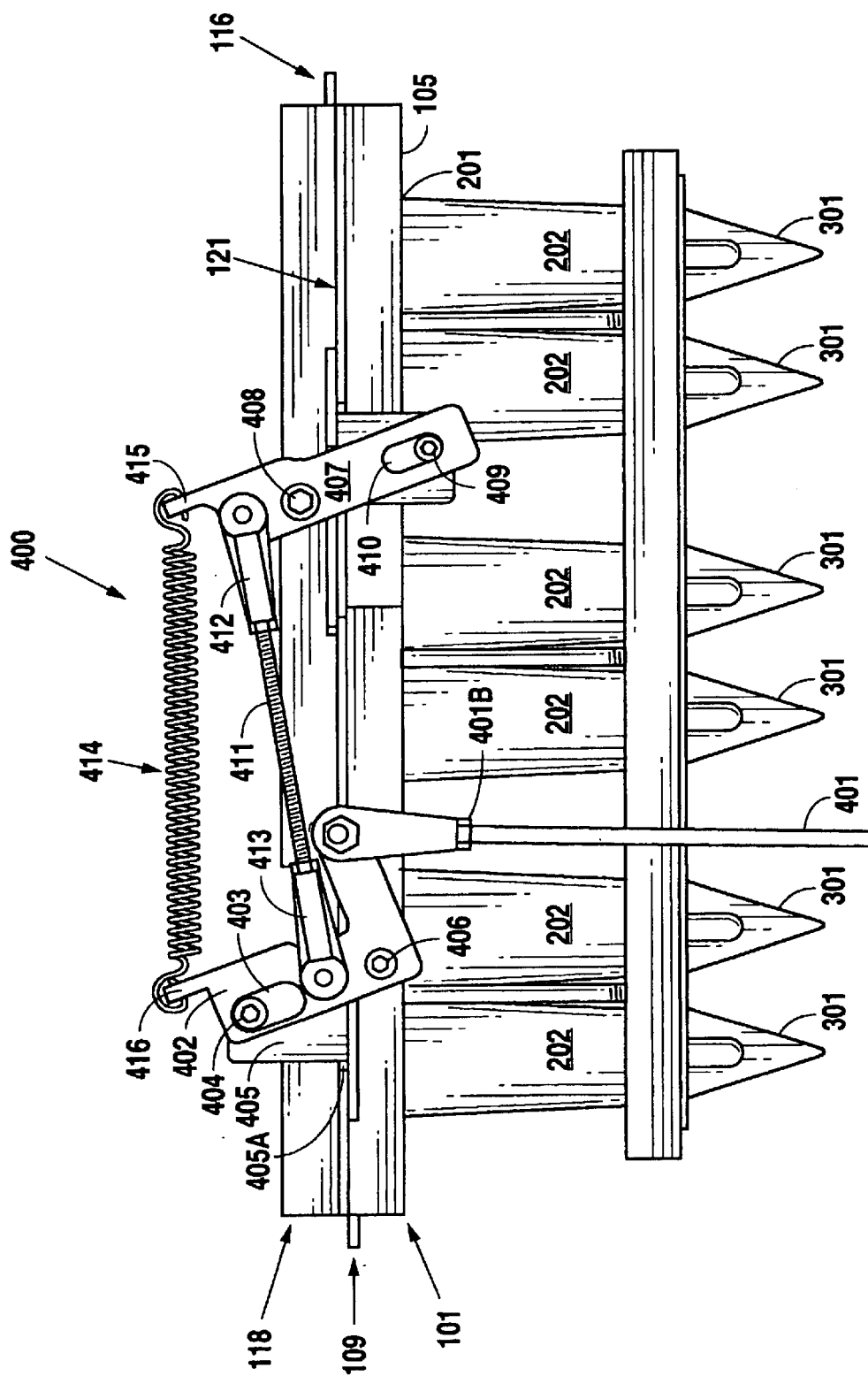
FIG. 8, is a side perspective illustration of the throttle valve assemble including means for shifting the throttle valve plates between opened and closed positions.

In FIG. 2, there is shown the interior of the first housing member 101 of the assembly 100 of the present invention. A series of bolt or threaded screw bores are spaced along the upper and lower perimeters 103 and 104 for receipt of companion bolts or screws (not shown) for affixation of the outer or exterior surface 105 of the housing member 101 to the upstream end of respective air velocity members 202 (FIG. 8). The interior surface 106 contains an upper wall 107 and a lower wall 108 along the respective edges of the housing member 101. It is within the area defined by the walls 107 and 108 and on the inner or interior surface 106 that a first throttle valve plate 109 is placed (FIG. 3A), as hereinafter described. The inner surface contains a series of centrally positioned and orientated, as shown, six ports 109A, 109B, 109C, 109D, 109E and 109F.

Figure 12:
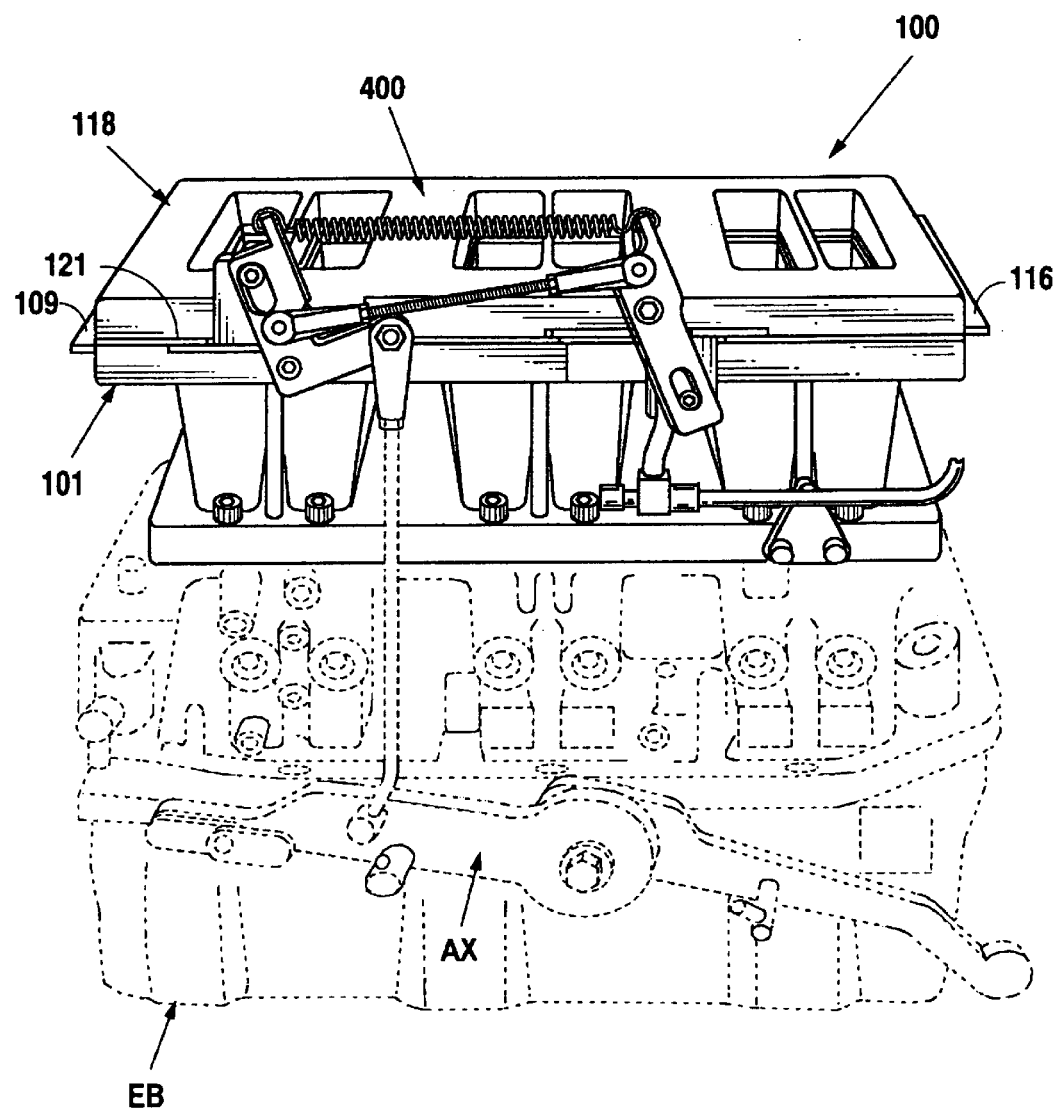
FIG. 12 is a schematic illustration of the assembly of the present invention as positioned upon a multi-cylinder engine block.

The ports 109A through 109F are sized to provide respective passageways 109A' through 109F' there though that are full opening and provide communication of air into the respective air velocity chambers 202 (if incorporated into the design), thence through the respective Reed valve 301 (if that feature is incorporated into the design), or, alternatively, directly into the air chambers of the combustion chambers (not shown) within the engine block EB (FIG. 12). The inner housing member 101 also contains a series of exhaust ports 110A through 110F within the walls 109A" through 109F" defining the ports 109A through 109, to exhaust passageways (not shown) through the housing 101 to exhaust discharge ports 111A and 111B. This exhaust orientation may also be used for conventional vacuum operated functions for the engine.

Figure 3A:
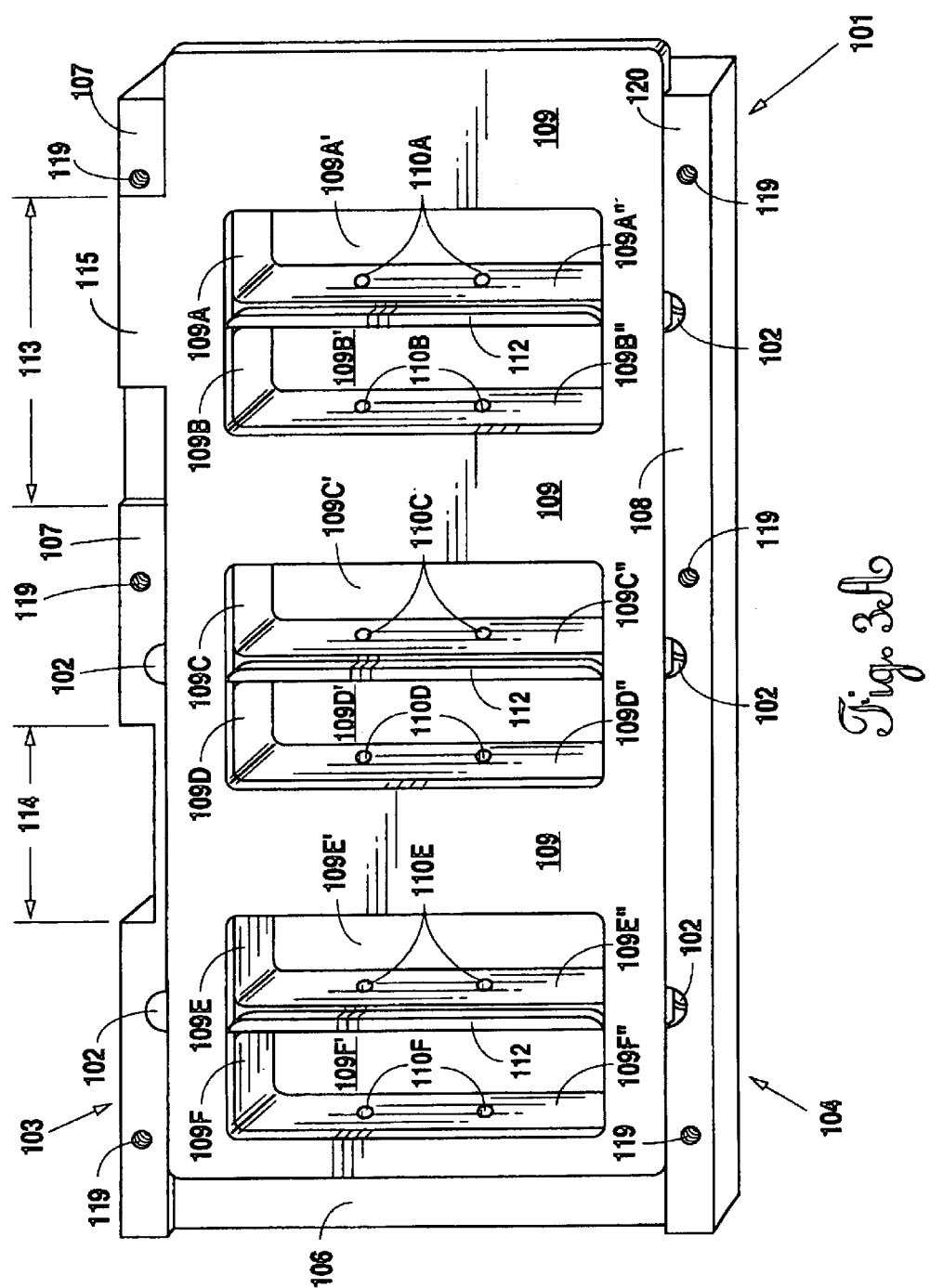
FIG. 3A is a similar schematic view of the interior of the first housing member, and including a slidable throttle valve plate positioned thereon to a position whereby the openings in the housing and the plate are fully opened.
Figure 3B:
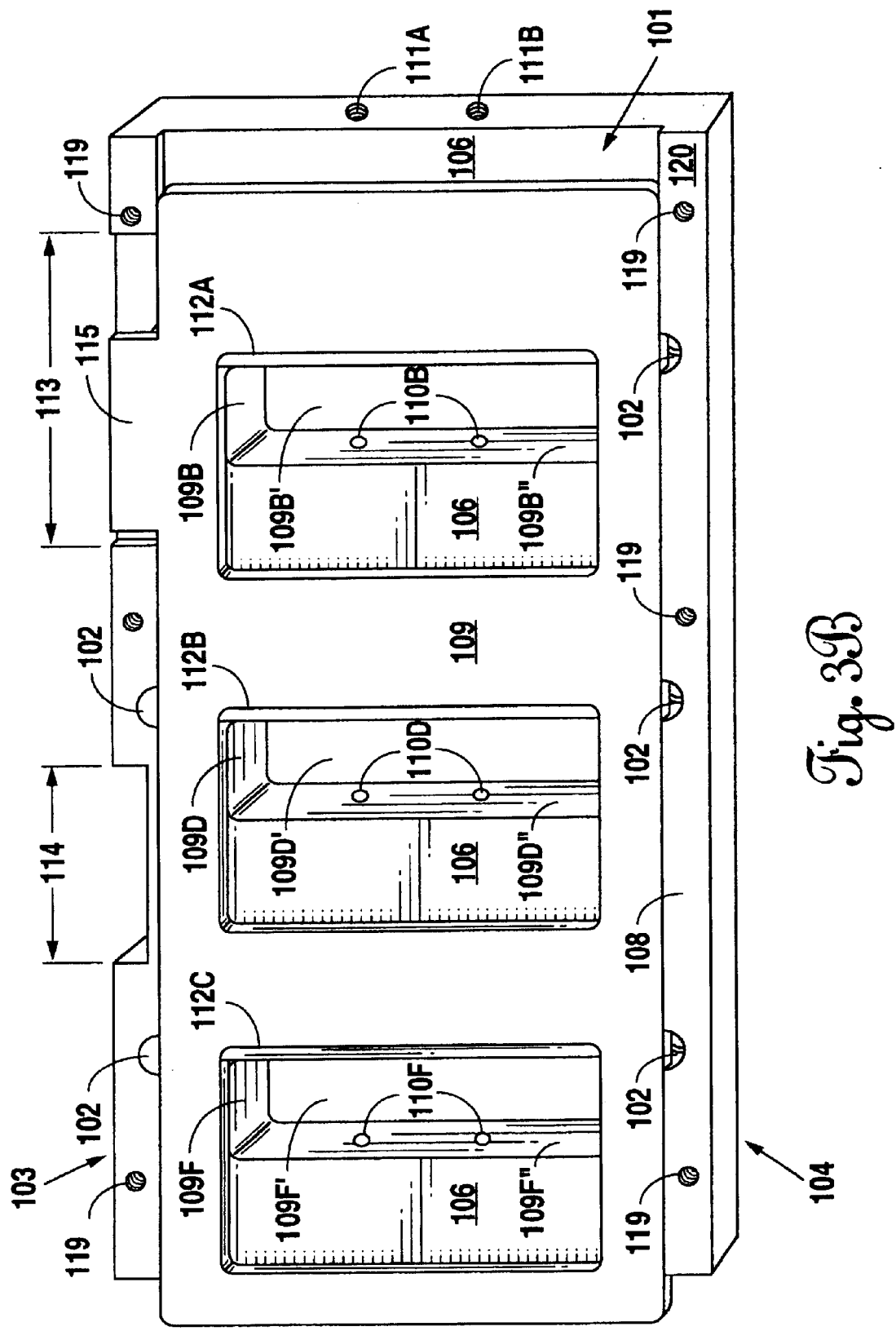
FIG. 3B is a view similar to that of FIG. 3A, and illustrating the throttle valve plate shown in FIG. 3A fully shifted in a direction whereby only half, i.e. three of six, of the chambers have been fully closed.

The inner surface 106 of the housing member 101 also provides a series of upwardly protruding plate stops 112A, 112B and 112C positioned to one side of alternate ports, i.e. adjacent port 109A, 109C, and 109E. As described in further detail hereinafter, as the first plate 109 moves from the open position, as shown in FIG. 3A, to the fully closed position, as shown in FIG. 3B, the respective stops 112A, 112B and 1112C, will prevent further movement of the plate 109 relative to the first housing member 101, and ports 109A, 109C and 109E will be sealingly covered, and thus closed, but the plate 106 will leave the other ports, i.e. 109B, 109D and 109F, fully open.

An elongated slot 113 is defined on the inner surface 106 of the housing member 101 for receipt of an outwardly and upwardly protruding companion tab 114 (FIG. 114) extending from the first plate member 109, for attachment of a shifting arm 403 (FIG. 8), for shifting of the plates as hereinafter described. Likewise a gap 114 is provided in the wall 107 for cooperative movements of a second tab 115 extending upwardly on a second plate 116 and a companion slot 117 for the second tab 115 in the second housing member 118 (FIG. 7A). Threaded bores 119 within and along a lower wall 120 on the inner surface 106 of the first housing member serve to receive companion bolts or screws (not shown) for securement of the respective component parts of the assembly 100.

Now referring to FIG. 4, in order to assure opening and closure sealing integrity with respect to the plate members 101 and 116, a seal plate member 121 is sandwiched between the respective plate valve members 101 and 116. This plate may be made out of any number of known materials which will permit sliding of the valve plates there across while preventing fluid communication there between, except through ports 122A through 122F provided therein and which are in alignment with the respective ports 109A through 109F of the first throttle valve plate 101. Likewise, the seal plate 121 has a companion slot 123 and gap 124 to permit selective smooth shifting of the valve plate members 106 and 116. A series of openings 125 along the top and bottom borders of the seal member 121 are in alignment with companion openings 119 in the first housing member 101.

Figure 5:
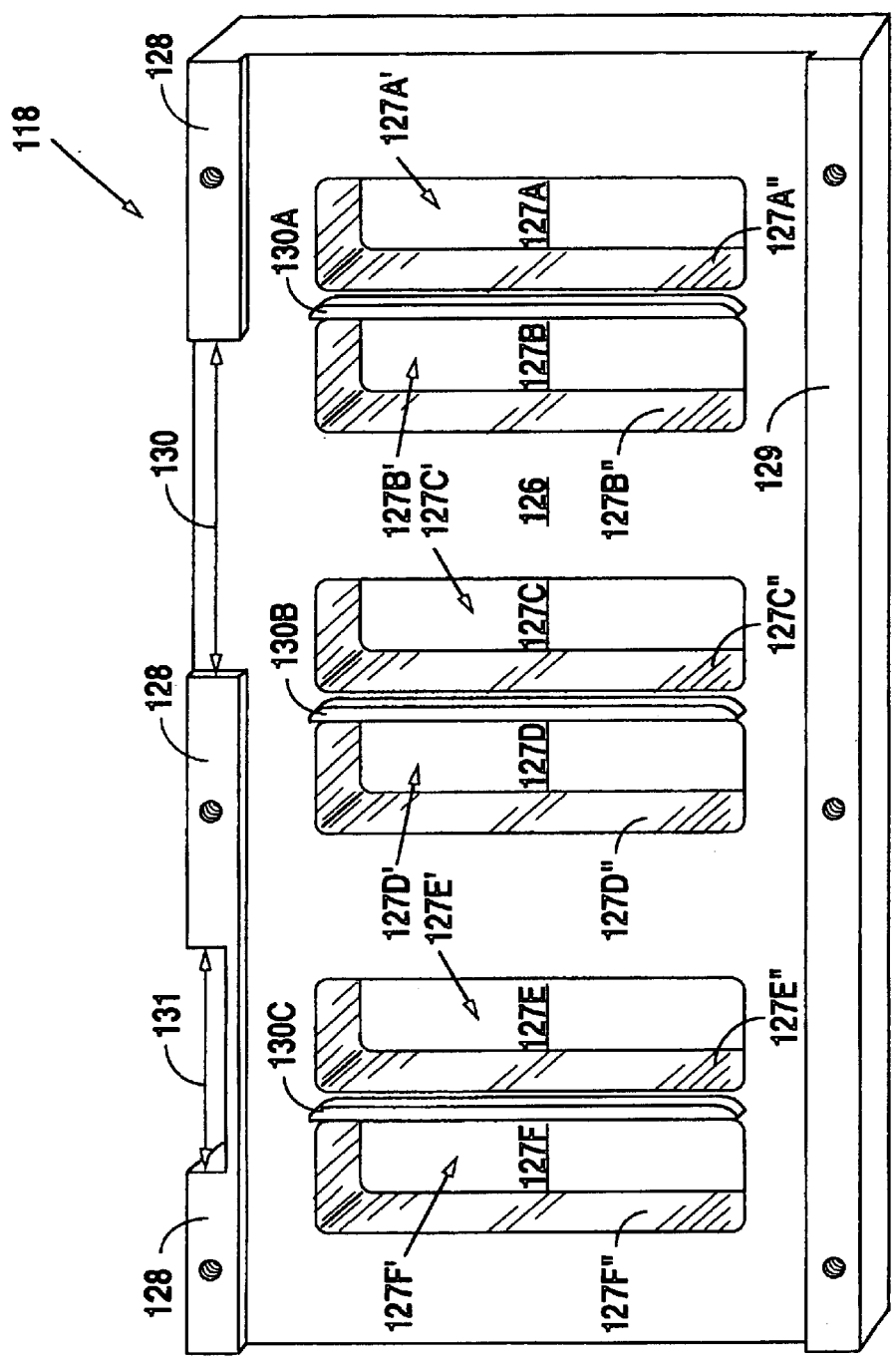
FIG. 5 is a view similar to that of FIG. 2, illustration the interior of the second housing member.

FIG. 5 illustrates the second housing member 118, and its interior surface 126. As with the first housing member 101, it contains a series of ports 127A through 127F, each port having walls 127A" through 127F" which define passageways 127A' through 127F' therethrough and which align with the respective passageways or openings 122A through 122F in the seal plate 121, as well with the ports 109A through 109F in the first housing member 101.

The second housing member 118 contains an upper outwardly protruding wall 128 on the inner surface 126 of the second member 118. Likewise, a lower wall 129 extends upwardly and outwardly along the lower part of the inner surface 126. The walls 128 and 129 are designed similar to those walls 107 and 108 in the first housing member 101, and serve the same purposes.

An operating slot 130 is defined along a portion of the wall 128 for receipt and movements of a companion tab 115 on the second throttle valve plate 116 (FIG. 7A). This tab and slot configuration 130/115 is similar in construction and operation as the slot and tab configuration 113/114, previously described.

Also, as shown in FIG. 5, the inner surface 126 of the second housing member 118 contains a series of stops 130A, 130B and 130C protruding upwardly from the surface 126 and adjacent alternating ports 127A through 127F. Note should betaken that the stops 130A, 130B and 130C and the stops 112A, 112B and 112C are positioned in the same orientation and position upon their respective housing members 101 and 118.

Figure 6A:
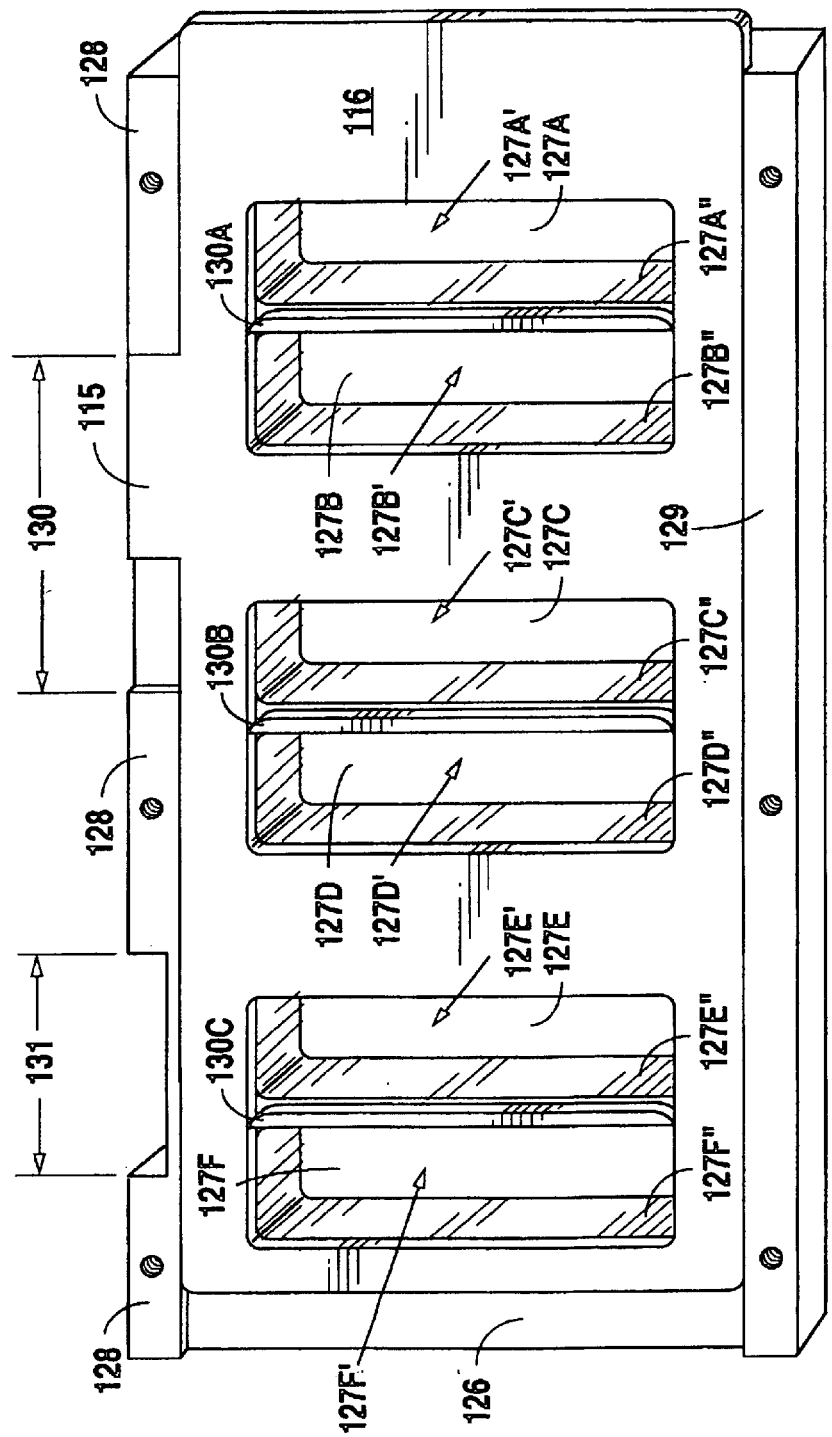
FIG. 6A is a view similar to that of FIG. 5, illustrating the positioning of a throttle valve plate onto and across the interior of the second housing member such that all of the ports are in the fully opened position.

FIG. 6A illustrates the second throttle valve plate member 116 positioned within the interior surface 126 of the second housing member 118. The valve plate member 116 is designed similarly to the first plate member 101, except for the location of its tab 115 in relation to the location of the tab 114 on plate valve member 109. This is clearly shown when comparing the views of FIG. 3A and that of FIG. 6A and can also be appreciated when viewing FIGS. 7A and 7B. This orientation of the slots and tabs 130/115 and 113/114 permit each plate valve 109 and 116 to be manipulated in such fashion that they shift in concert, but in opposite directions, toward open and closed positions of the ports through the respective component parts of the air intake assembly 100. Each plate valve member 116 and 106 will completely pass across, and thus close, only half of the respective ports therein while the other plate valve member, upon shifting in the opposite direction, will pass across and close the remaining ports in the assembly 100. In this fashion, all ports are full opening and full closing, while also permitting maximum port sizing to conform with the exact maximum openings through and into the ignition chambers of the engine cylinders.

Figure 9:
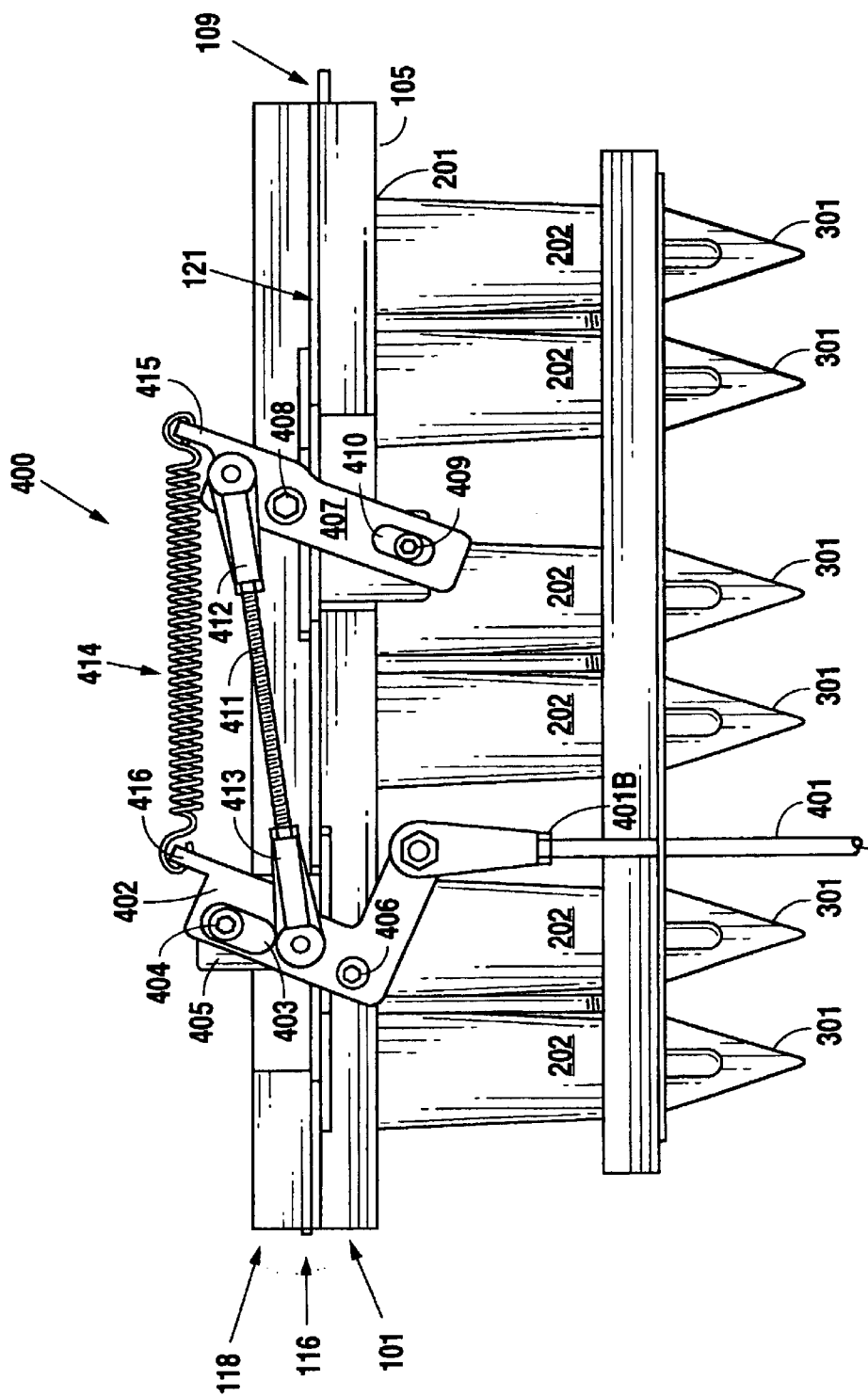
FIG. 9 is a view similar to that of FIG. 8, illustrating the relative positioning of the plates and the shifting means when the assembly is operated to manipulate the plates from the position of FIG. 8 to that of FIG. 9.
Figure 14:
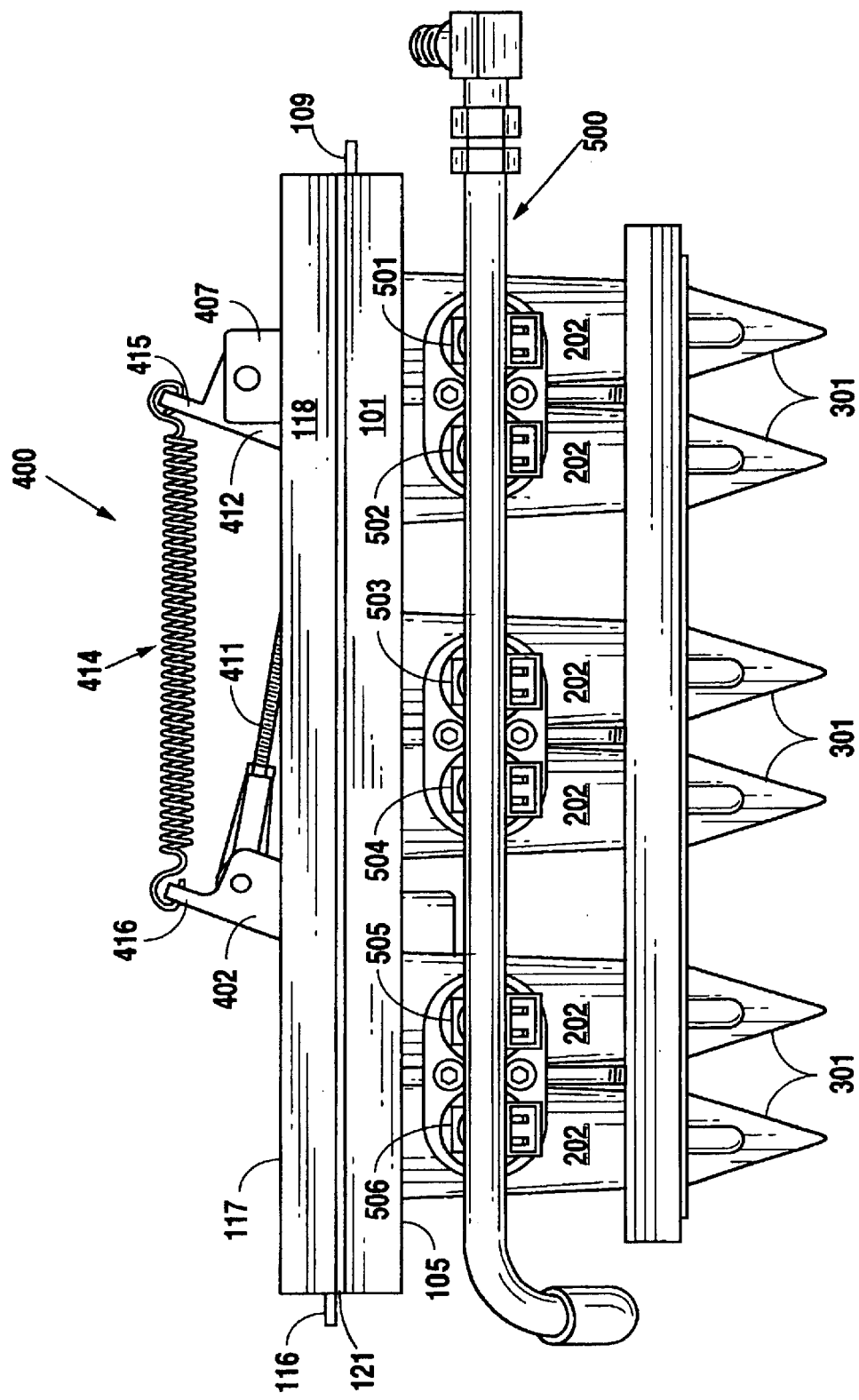

FIGS. 8 and 9 illustrate the throttle valve assembly in concert with a series of air velocity members 202, which are secured onto the outer surface 105 of the first valve plate housing member 101. Each of the velocity members may form a stack of sized component parts such that the particular resulting stack configuration may be of varying height and interior volume and may be selected to accommodate a particular engine configuration and/or need. Thus, a variety of incremental adjustments can be readily and quickly made that are less than or more than the height and configuration as shown in the preferred illustration in FIG. 8 to achieve a desired performance. In addition, there may be instances where performance characteristics are improved by varying the height of the velocity stacks to each cylinder of a multi-cylinder engine.

Reed valves 301, of known relatively flexible construction, are placed, as shown particularly in FIGS. 8 and 9, at the downstream end of each of the air velocity members 202. The Reed valves are made of a thin metal or fiber that will open under vacuum from each cylinder at the appropriate time during the stoke cycle.

Also as shown in FIGS. 8 and 9, the assembly 100 further includes shifting means 400 for shifting the throttle valve plates 109 and 116 relative to one another for opening and closing of the respective air ports and air passageways through ihe assembly 100. The shifting means 400 is operated by an elongated thin solid armature 401 having an end 401A secured to an accelerator or throttle assembly AX, of known and varying construction, forming a part of the engine block assembly EB. The accelerator assembly AX forms no particular part of the invention at hand, save to say that the armature 401 is mechanically manipulated by, in concert with the introduction of fuel quantities and timing thereof into the ignition chambers within the engine block EB.

The armature 401 has an opposite end 401B secured by means of a screw, or similar securing method, to an end of a shifting arm 402. The shifting arm 402 has a grooveway profiled along one end thereof for traveling receipt of a traveling pin 404 which, in turn, has one end thereof secured to a flat extender 405 which is joined at its inboard end 405A by a 90 degree securement to tab 115 on the second throttle valve plate 116. The arm 402 is also secured by another securing pin 406 to the outer surface of the first housing member 101 for pivoting movements thereacross.

A similarly configured arm 407 is provided which is pivotally secured to the second or outer housing member 118 by pin 408. The arm 407 is likewise secured at its opposite end by another traveling pin received within a grooveway 410 on the arm 407. The pin 409 is secured to and protrudes from a flat extender 405 secured to the top of the tab 114 on the first throttle valve plate 109. A threaded bridge member extends between and is secured to each of the arms 402 and 402 and may be rotated by hand to move same relative to the thread receptacles 412 and 413 to adjust the positioning of the arms 402 and 402 relative to one another for fine tuning of the opening and closing cycle for the plate valves. A biasing means, such as spring 414 is also provided, with respective ends secured to a tip 415, 416 of the arms 402/407 to urge the throttle valve plates inwardly relative to the housing members. By manipulating the armature 401 in one direction, i.e. toward the engine block EB, from the position as shown in FIG. 8 and FIG. 10A, to the position shown in FIG. 9 and 10B, the throttle plates may be shifted from fully open position to fully closed position, or to any desired position therebetween.

FIG. 11 illustrates the addition of a fuel injector means or assembly 500, of known construction and design. The injector assembly 500 includes a series of fuel injectors 501, 502, 503, 504, 505 and 506 which are mounted in the respective walls of the air velocity members 202. Such fuel injectors are well known to those skilled in the combustion engine design and use art and are commercially available from a number of sources and in a variety of configurations.

Although the invention has been described in terms of specified embodiments which are set forth in detail, it should be understood that this is by illustration only that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A multi-stage sliding air throttle valve assembly for use with a multiple cylinder engine, comprising:

(a): a housing including first and second housing members, each of said housing members having interior and exterior faces, a shifting slot profiled on each of said housing members, said first housing member being securable along said exterior face relative to said engine;

(b): a plurality of ports defining air passageways disposed through each of said housings, each of said ports being alignable with one said cylinder;

(c): a plurality of slidable throttle valve plates shiftable from a first position whereby each of said ports is fully open relative to said cylinders and shiftable to a second position whereby each of said ports is fully closed relative to said cylinders, each of said plates including a protruding tab member for operative receipt within one of said shifting slots;

(d): at least one throttle plate stop protruding from the interior face of said first housing member and engageable with one of said throttle valve plates for preventing slidable movement of said one throttle valve plate in one direction during engagement;

(e): at least one throttle plate stop protruding from the interior face of said second housing member and engageable with another of said throttle valve plates for preventing slidable movement of said another throttle valve plate in a direction opposite said one direction during engagement; and (f): means for shifting said throttle valve plates relative to one another in first directions whereby when said throttle valve plates are in one position, the air passageways are filly open, and when said throttle valve plates are shifted by said shifting means in second, opposite directions, said air passageways are fully closed.

2. The valve assembly of claim 1 further comprising at least one non-moveable plate means sealingly disposed between each of said throttle valve plates and for permitting slidable movements of said plates.

3. The valve assembly of claim 1 or claim 2, further comprising: an air velocity assembly secured between said engine and said air throttle valve assembly, and including air velocity chambers, each of said chambers having an opening defined therethrough and alignable with the chambers in said engine for the passage of air from the air passageways through each of the housings and the slidable throttle valve plates into said chambers of said engine.

4. The valve assembly of claim 1 or claim 2, further comprising an air velocity assembly secured between said engine and said air throttle valve assembly, and including air velocity chambers, each of said chambers having an opening defined therethrough and alignable with the chambers in said engine for the passage of air from the air passageways through each of the housings and the slidable throttle valve plates into said chambers of said engine, and further comprising a series of reed valves secured to the air velocity assembly.

5. The valve assembly of claim 1 or claim 2 further comprising a series of reed valves having reed valve passageways therethrough in selective communication with the air passageways through the throttle valve housing members and the valve plates.

6. The valve assembly of claim 1 or claim 2 further comprising a shifting assembly for shifting each of said plates between said first and second positions.

7. The valve assembly of claim 1 or claim 2 wherein said means for shifting said throttle valve plates comprises: an operating armature having first and second ends, said first end being secured to and manipulatable by a throttle of said engine, said second end being secured to at least one of a plurality of shifting arms, each shifting arm being secured to a respective tab on said plates, a bridge joining each of said arms for transferring manipulative movements by said armature in a first direction through said shifting arms to move said arms in concert in one direction to shift said plates from one position to another position to at least partially open said passageways and upon manipulation of said armature in a second direction for movement of said arms in concert in a second direction to shift said plates in another direction to at least partially close said passageways, and biasing means secured to said arms for urging said arms in a direction to at least partially close said passageways.

8. A two-stroke internal combustion engine comprising:

(a) a cylinder block;

(b) a plurality of combustion cylinders therein, each of said cylinders receiving a mixture of a combustible fuel and air for ignition therein;

(c) a multi-stage air throttle valve assembly secured to said bock, said valve assembly including:

(1) a housing including first and second housing members, each of said housing members having interior and exterior faces, a shifting slot profiled on each of said housing members, said first housing member being securable along said exterior face relative to said engine;

(2): a plurality of ports defining air passageways disposed through each of said housings, each of said ports being alignable with one said cylinder;

(3): a plurality of slidable throttle valve plates shiftable from a first position whereby each of said ports is fully open relative to said cylinders and shiftable to a second position whereby each of said ports is fully closed relative to said cylinders, each of said plates including a protruding tab member for operative receipt within one of said shifting slots;

(4): at least one throttle plate stop protruding from the interior face of said first housing member and engageable with one of said throttle valve plates for preventing slidable movement of said one throttle valve plate in one direction during engagement;

(5): at least one throttle plate stop protruding from the interior face of said second housing member and engageable with another of said throttle valve plates for preventing slidable movement of said another throttle valve plate in a direction opposite said one direction during engagement; and (6): means for shifting said throttle valve plates relative to one another in first directions whereby when said throttle valve plates are in one position, the air passageways are fully open, and when said throttle valve plates are shifted by said shifting means in second, opposite directions, said air passageways are fully closed.

9. The engine of claim 8 further comprising at least one non-moveable plate means sealingly disposed between each of said throttle valve plates and for permitting slidable movements of said plates.

10. The engine of claim 8 further comprising: an air velocity assembly secured between said engine and said air throttle valve assembly, and including air velocity chambers, each of said chambers having an opening defined therethrough and alignable with the chambers in said engine for the passage of air from the air passageways through each of the housings and the slidable throttle valve plates into said chambers of said engine.

11. The engine of claim 8 further comprising: an air velocity assembly secured between said engine and said air throttle valve assembly, and including air velocity chambers, each of said chambers having an opening defined therethrough and alignable with the chambers in said engine for the passage of air from the air passageways through each of the housings and the slidable throttle valve plates into said chambers of said engine, and further comprising a series of reed valves secured to the air velocity assembly.

12. The engine of claim 8 further comprising a series of reed valves having reed valve passageways therethrough in selective communication with the air passageways through the throttle valve housing members and the valve plates.

13. The engine of claim 8 further comprising a shifting assembly for shifting each of said plates between said first and second positions.

14. The engine of claim 13 wherein said shifting assembly for shifting said throttle valve plates comprises: an operating armature having first and second ends, said first end being secured to and manipulatable by a throttle of said engine, said second end being secured to at least one of a plurality of shifting arms, each shifting arm being secured to a respective tab on said plates, a bridge joining each of said arms for transferring manipulative movements by said armature in a first direction through said shifting arms to move said arms in concert in one direction to shift said plates from one position to another position to at least partially open said passageways and upon manipulation of said armature in a second direction for movement of said arms in concert in a second direction to shift said plates in another direction to at least partially close said passageways, and biasing means secured to said arms for urging said arms in a direction to at least partially close said passageways.

15. The engine of claim 8 further comprising fuel injector means secured to said block for injecting fuel into each of the combustion cylinders.

* * * * *